Aug. 20, 1957 B. SOLOW 2,803,205
CUTTING MECHANISM
Filed Dec. 16, 1954 2 Sheets-Sheet 1
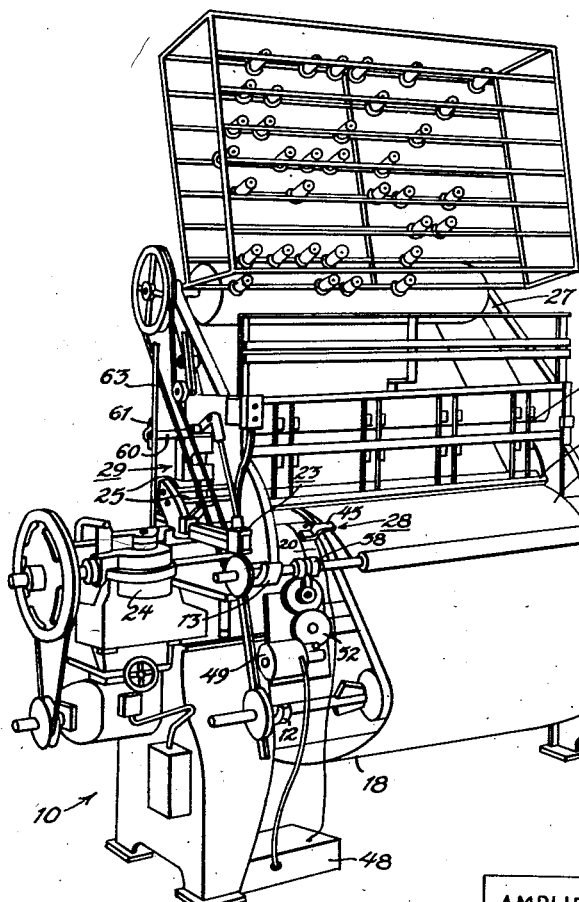
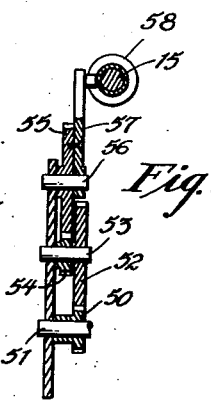
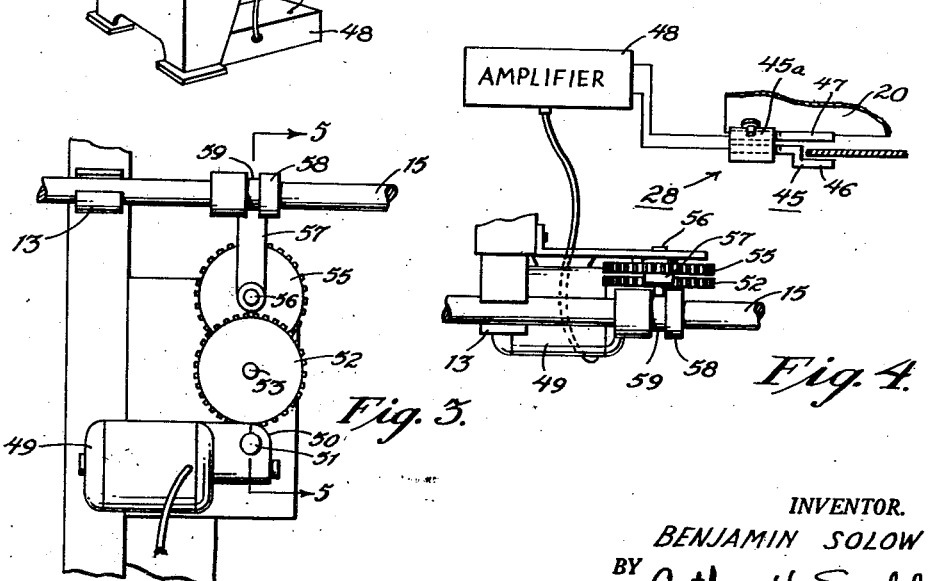
INVENTOR.
BENJAMIN SOLOW
BY Arthur H. Seidel
ATTORNEY.

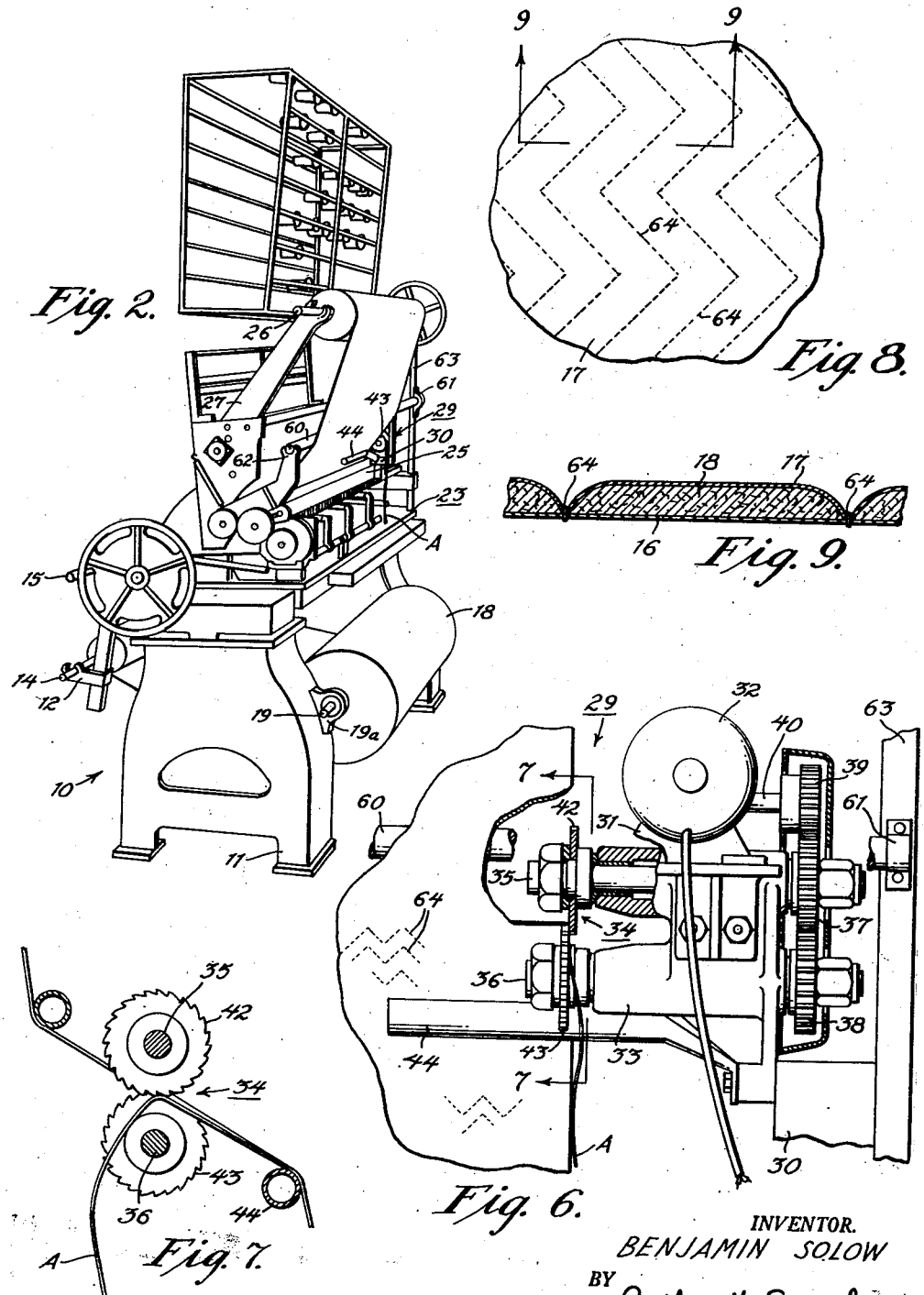

United States Patent Office
2,803,205
Patented Aug. 20, 1957

2,803,205

CUTTING MECHANISM

Benjamin Solow, North Hollywood, Calif.

Application December 16, 1954, Serial No. 475,759

6 Claims. (Cl. 112—118)

The present invention relates to a cutting mechanism or an edge trimmer mechanism, and more particularly, to a mechanism for making a straight edge on quilting material, batting pads and the like; and to a quilting machine that delivers a clean straight edged product.

The obtainment of a clean continuous and uniform straight edge for "fluffy" material such as quilting and batting is necessary for accurate layout work. Quilting material, which normally comprises a face of rayon or other fabric, and a backing of cheese cloth or other material, separated by wadding such as cotton or wool wadding; the whole joined together by design or straight line stitching which stitching is effected by means of a quilting machine, has proved most difficult to edge-trim.

The use of pressure cutters, knives, etc. has proved unsatisfactory due to jamming, rapid dullness, etc. occasioned by the resilient and fluffy nature of the quilting material. Moreover, the obtainment of a clean edge without irregular projections of the wadding has proven most difficult due to the irregular spatial arrangement of the wadding fibers.

There is another and serious difficulty concomitant with the trimming of quilting, namely that the component cloth materials are not evenly or uniformly wound on their mandrels, and therefore the distance between the side edge and the outermost needle of the quilting machine varies. This variation may be as much as several inches per given roll, and indiscriminate cutting along a fixed line will cause the loss of valuable material, and in the case of a design stitched pattern may interfere with the resultant design.

This invention has as an object the provision of a useful cutter.

This invention also has as an object the provision of a trimmer capable of effecting facile trimming of quilting material and the like.

Another object of this invention is the provision of a trimming mechanism in which the cutting of the edge of quilting material and the like is effected with the minimal loss of quilting material.

A further object of the present invention is the provision of an edge cutter capable of cutting wadding or the like to yield a regular edge.

A still further object is the provision of a quilting machine that furnishes quilting material having a clean, continuous and uniform straight edge.

Another object is the provision of a quilting machine that furnishes quilting material having an edge evenly spaced from the adjacent stitching.

Other objects will appear hereinafter.

For the purposes of illustrating this invention, one form thereof, which is presently preferred, is shown in the accompanying drawings; it being understood, however, that the invention is not limited to the precise arrangements and instrumentalities illustrated.

Figure 1 is a front perspective and partly diagrammatic view of a quilting machine of the present invention with quilting material therein.

Figure 2 is a rear perspective and partly diagrammatic view of the quilting machine of the present invention with quilting material therein.

Figure 3 is a fragmentary front elevation of the edge controller portion of the quilting machine.

Figure 4 is a fragmentary plan and partly diagrammatic view of the edge controller portion of the quilting machine.

Figure 5 is a section on line 5—5 of Figure 3.

Figure 6 is a fragmentary rear elevational view of the edge cutter portion of the quilting machine.

Figure 7 is a section on line 7—7 of Figure 6.

Figure 8 is a fragmentary plan view of finished quilting material.

Figure 9 is a section on line 9—9 of Figure 8.

Referring to the drawings, the numeral 10 designates an automatic multi-needle quilting stitching machine. Quilting machine 10 includes a frame 11 having yoke carriers 12 and 13 on which grip rollers 14 and 15 carrying respectively the backing 16 and facing 17 of the product are retained. The grip rollers 14 and 15 are freely carried in yoke carriers 12 and 13, and may be moved axially in respect to the longitudinal axis of grip rollers 14 and 15 on yoke carriers 12 and 13. The backing 16 may be cheese cloth or the like, and the facing 17 may be a fabric, such as satin, rayon, etc.

The wadding 18, which may be of cotton or woolen fibers, is retained on a grip roller 19 carried on the yoke carriers 19a on the frame 11.

The aforesaid quilting material components are fed with the facing 17 uppermost, the wadding 18 disposed therebeneath, and the backing 16 undermost, over the apron 20. The quilting material components are retained in position by presser bar 21 and vertically reciprocal rows of stitching needles 22 effect the stitchwork design. The needle spacing patterns are fixed and the design on the quilting material components is changed by varying their movement beneath the needles. This is effected by having the apron mounted on a carriage designated generally by the numeral 23, and moving the carriage 23, apron 20 and the quilting material components carried thereon in a direction of movement angularly disposed or transverse to that of the quilting material components. The carriage 23 is a conventional support carriage on which the apron 20 is carried and may be moved in a variety of directions within a plane, the carriage 23 being carried upon frame 11. The applicant makes no claim whatsoever to the means by which carriage 23 is carried on frame 11, a variety of such means being known to those skilled in the art, and a variety of means being actually employed in the art. Controlled transverse movement of the carriage 23 may be effected by conventional cam means 24. By varying the movement of the carriage 23 with different cams, different patterns of stitching, such as diamond, zig zag, curved, circular, etc. patterns may be effected on the quilting components. Means for moving the carriage 23 and apron 20 are disclosed in Boettcher Patent 1,948,876 issued February 27, 1934.

The stitched quilting material is passed between knurled feed rollers 25 onto the product take-up roller 26 which is carried on fixedly secured yoke carrier 27.

The foregoing constitutes an abbreviated description of a conventional quilting stitching machine such as model #2220 made by Premier Textile Machinery Co., Inc., 440 Mercer Street, Jersey City 6, N. J.

In the quilting machine of my invention photoelectric cell edge controller means designated generally by the numeral 28 and edge trimmer means designated generally by the numeral 29 are provided. Edge trimmer means 29 is carried on post 30 anchored to carriage 23 and includes a motor bracket 31 for motor 32 which drives the edge trimmer means 29, and also an edge trimmer housing 33 containing edge cutting 34.

Edge cutter 34 comprises a pair of shafts 35 and 36, which are generally parallel to each other (e. g. absolute parallelism cannot normally be obtained, and I have found that slight deviations, such as an angle of ¼ degree or so to be practicable). Shafts 35 and 36 are geared to each other by respective spur gears 37 and 38, which in turn are driven by pinion gear 39 on the motor shaft 40 of motor 32.

A pair of toothed cutting wheels 42 and 43 having a shape similar to millers on a milling machine are positioned on shafts 35 and 36 and are retained in staggered alignment to each other, with the peripheral portion of the outer face of wheel 42 overlapping the peripheral portion of the inner face of wheel 43. The outer periphy of the toothed cutting wheels 42 and 43 are provided with a continuous sawtooth edge, as shown particularly in Figure 7.

Cutting wheels 42 and 43 are parallel to each other and lie in a plane perpendicular to the plane of the quilting material components. If tilted at a slight angle to each other, such as a ¼ degree, cutting wheels 42 and 43 should contact each other at the point of contact with the quilting material. The line passing between the juxtaposed faces of cutting wheels 42 and 43, is, of course, fixed and defines the cut edge of the quilting material. Rotary movement of the cutting wheels 42 and 43 results in entrapment of the edge portion of the quilting material therebetween, and simultaneous cutting and pinking or compressing thereof. The quilting material being cut is engaged by the cutting wheels 42 and 43, with the juxtaposed faces of the cutting wheels and the sawteeth on the periphery engaging the quilting material and feeding it along. This simultaneous compression and cutting avoids frayed edges, and the resultant edge is clean and without irregular dangling projections. The cut discard material falls from the edge as a continous thin band or web designated A.

A short support rod 44, clamped or otherwise secured to post 30 may be retained beneath the cutting wheels 42 and 43 to ensure an even and taut feed to the cutting wheels 42 and 43. A roller 60 is carried on bearings 61 and 62 (bearing 61 being on post 63) above the cutting wheels 42 and 43 and in back of the quilting material and aids in maintaining the quilting material taut for cutting.

Due to the uneven winding of the quilting material components on their respective grip rollers, and other mechanical faults, the edge portion of the quilting material presented to cutting wheels 42 and 43 will not be of uniform width if the only control of the quilting material movement is its forward movement. Under these circumstances there is a possibility of serious errors, as in some cases, during the course of forming a single role of product, the cutting wheels 42 and 43 would be cutting at various times a wide band of discard material, and at other times, a relatively narrow band of discard material, or perhaps might even be free of the quilting material.

However, in the quilting machine of my invention these difficulties are largely or entirely avoided by edge controller means 28. Edge controller means 28 includes a light and photoelectric cell unit 45, secured by means of bracket 45-a to the upper surface of apron 20. Photoelectric cell unit 45 comprises a small light bulb 46 spaced from a photoelectric cell 47. The quilting material is moved in the space between light bulb 46 and phtotoelectric cell 47. The photoelectric cell 47 is connected to a suitable amplifier unit of conventional design, diagrammatically shown as 48, and thence to a reversible motor 49 having a gear 50 secured on a motor shaft 51. Gear 50 engages with and drives gear 52 carried on shaft 53. Coaxial with gear 52 is relatively small diametered gear 54 which engages with control gear 55 carried on shaft 56. A crank 57 is fixedly secured to the face of control gear 55. A collar 58 is fixedly secured to grip roller 15. Collar 58 is provided with a centrally positioned circumferential groove 59 in which the arm of crank 57 rides or is seated.

The photoelectric cell unit 45 is set to align and control the edge relationship of the quilting material with the cutting wheels 42 and 43. Thus, whenever the free edge of the quilting material shifts in one direction or another, the photoelectric cell unit 45 actuates the reversible motor 49 which urges the crank 57 in the direction opposite to the direction of shift, the crank riding in collar 58 urges the grip roller 15 on its yoke carrier 12 in said direction. The motor 49 is stopped by the photoelectric cell unit 45 when the free edge of the quilting material is properly aligned with the photoelectric cell unit 45, and is not actuated again until the free edge shifts.

In this manner the free edge of the quilting material is aligned with the cutting wheels 42 and 43 and a straight and continuous trimmed edge is obtained.

Figures 8 and 9 show the finished quilting material structure with the backing 16, wadding 18 and facing 17 retained together by means of stitching 64.

Although I have shown one form of quilting machine, it is to be understood that the cutter of my invention may be used in combination with other embodiments of quilting or stitching machines; and that the quilting machine of my invention may incorporate various carriage and needle mechanisms.

Although the embodiment of the present invention has been described in detail, the scope thereof is not to be limited except as provided for in the here-appended claims.

1. A stitching machine including a fixedly positioned bank of reciprocally movable needles, means for advancing a web of material in operative relationship to said bank of needles, means for moving said material in a direction transverse to the direction of advancement, means for trimming an edge of said advancing material fixedly secured on said means for moving said material in a direction transverse to the direction of material advancement, and means for aligning said edge of said material, with the aforesaid trimming means, whereby a straight trimmed edge is obtained on the web of material.

2. A stitching machine including a fixedly positioned bank of reciprocally movable needles, means for advancing a web of material in operative relationship to said bank of needles, means for moving said material in a direction transverse to the direction of advancement, and means for trimming an edge of said advancing material fixedly secured on said means for moving said material in a direction transverse to the direction of material advancement.

3. In a stitching machine in which a web of material is advanced in operative relationship to a bank of reciprocally movable needles, and in which means are present for moving said material in a path transverse to the direction of advance, the improvement which comprises means for trimming the edge of said advancing web of material after said material has passed in operative relationship to said bank of needles, said trimming means being fixedly secured on said means for moving said material in a direction transverse to the direction of material advancement, said trimming means comprising a pair of oppositely rotating toothed cutters, and means for rotating said toothed cutters, the radial planes of said cutters, being generally parallel and generally normal to the plane of the web of advancing material, each cutter comprising a toothed cutting disc having a flat radial face and a plurality of evenly spaced teeth extending radially outwardly about its periphery, each of the teeth on each cutting disc having one side of relatively gentle slope, and another side of relatively steep slope, said cutters being in staggered relationship to each other, and at least partially overlapping, with the overlapped portions of the cutters being juxtaposed to each other, and means for aligning the edge of the material that is to be trimmed with the cutters, said means including a control unit for locating the edge of the material and a driver for urging the material transversely to its direction of advancement, whereby a band of material of generally constant width is presented to the edge trimming means.

4. A stitching machine including a fixedly positioned bank of reciprocally movable needles, means for advancing a web of material in operative relationship to said bank of needles, means for moving said material in a direction transverse to the direction of advancement, means for trimming an edge of said advancing material fixedly secured on said means for moving said material in a direction transverse to the direction of material advancement, said last-mentioned means being positioned subsequent to said bank of reciprocally movable needles, whereby the edge of said advancing material is trimmed after said material has passed in operative relationship to said bank of needles, and means for aligning said edge of said material with the aforesaid trimming means positioned before said bank of reciprocally movable needles, whereby a straight trimmed edge is obtained on the web of material.

5. A stitching machine including a fixedly positioned bank of reciprocally movable needles, means for advancing a web of material in operative relationship to said bank of needles, means for moving said material in a direction transverse to the direction of advancement, means for trimming an edge of said advancing material fixedly secured on said means for moving said material in a direction transverse to the direction of material advancement and behind said fixedly positioned bank of reciprocally movable needles, said trimming means including parallel shafts, a rotatable toothed cutting disc fixedly secured on each shaft, each disc having a flat radial face and a plurality of evenly spaced teeth extending radially outwardly about its periphery, each of the teeth on each cutting disc having one side of relatively gentle slope, and another side of relatively steep slope, the cutting discs being mounted in staggered relationship to each other with the flat radial faces juxtaposed, and the peripheral portions of the juxtaposed faces overlapping, and engaged gears on said shafts for oppositely rotating said shafts.

6. A stitching machine including a fixedly positioned bank of reciprocally movable needles, means for advancing a web of material in operative relationship to said bank of needles, means for moving said material in a direction transverse to the direction of advancement, means for trimming an edge of said advancing material fixedly secured on said means for moving said material in a direction transverse to the direction of material advancement and behind said fixedly positioned bank of reciprocally movable needles, said trimming means including parallel shafts, a rotatable toothed cutting disc fixedly secured on each shaft, each disc having a flat radial face and a plurality of evenly spaced teeth extending radially outwardly about its periphery, each of the teeth on each cutting disc having one side of relatively gentle slope, and another side of relatively steep slope, the cutting discs being mounted in staggered relationship to each other with the flat radial faces juxtaposed, and the peripheral portions of the juxtaposed faces overlapping, and engaged gears on said shafts for oppositely rotating said shafts, and means for aligning said edge of said material with the aforesaid trimming means, said last-mentioned means being positioned before the fixedly positioned bank of reciprocally movable needles and comprising a light and photoelectric cell unit for following the edge of advancing material coupled with means for urging the advancing material in a direction transverse to its direction of advancement.

References Cited in the file of this patent

UNITED STATES PATENTS

| | | |
|---|---|---|
| 276,860 | Morris | May 1, 1883 |
| 1,948,876 | Boettcher | Feb. 27, 1934 |
| 2,078,669 | King | Apr. 27, 1937 |
| 2,082,634 | Johnstone | June 1, 1937 |
| 2,184,660 | Avery | Dec. 26, 1939 |
| 2,332,104 | Meyer | Oct. 19, 1943 |
| 2,675,437 | Theobald | Apr. 13, 1954 |